US011221776B2

(12) United States Patent
Ish et al.

(10) Patent No.: US 11,221,776 B2
(45) Date of Patent: Jan. 11, 2022

(54) METADATA INDICATION FOR A MEMORY DEVICE

(71) Applicant: Micron Technology, Inc., Boise, ID (US)

(72) Inventors: Mark Ish, San Ramon, CA (US); Yiran Liu, Boise, ID (US); Tom V. Geukens, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 94 days.

(21) Appl. No.: 16/730,919

(22) Filed: Dec. 30, 2019

(65) Prior Publication Data
US 2021/0200436 A1  Jul. 1, 2021

(51) Int. Cl.
*G06F 3/06* (2006.01)
*G06F 12/1009* (2016.01)
*G06F 11/10* (2006.01)

(52) U.S. Cl.
CPC ............ *G06F 3/064* (2013.01); *G06F 3/0619* (2013.01); *G06F 3/0652* (2013.01); *G06F 3/0653* (2013.01); *G06F 3/0659* (2013.01); *G06F 3/0673* (2013.01); *G06F 11/1004* (2013.01); *G06F 12/1009* (2013.01); *G06F 2212/1032* (2013.01)

(58) Field of Classification Search
CPC .... G06F 3/064; G06F 11/1004; G06F 3/0659; G06F 12/1009; G06F 3/0652; G06F 3/0673; G06F 3/0619; G06F 3/0653; G06F 2212/1032
See application file for complete search history.

(56) References Cited

U.S. PATENT DOCUMENTS

2020/0034243 A1* 1/2020 Venkatesan ......... G06F 11/1471
2020/0133499 A1* 4/2020 Vokaliga ............... G06F 3/0604
2020/0218465 A1* 7/2020 Klein .................... G06F 3/0608
2020/0327066 A1* 10/2020 Li ......................... G06F 3/0679

* cited by examiner

*Primary Examiner* — Sean D Rossiter
(74) *Attorney, Agent, or Firm* — Holland & Hart LLP (57) ABSTRACT

Methods, systems, and devices for metadata indication are described herein. A method includes receiving, from a host system, a read command to retrieve information from a first block of a memory device, identifying a transfer unit associated with the first block indicated in the read command, identifying an indicator in metadata of the identified transfer unit indicating that at least one sector of the transfer unit has been altered based at least in part on identifying the transfer unit, validating data of the transfer unit stored in the memory device based at least in part on identifying the indicator in the metadata, and retrieving the information stored in the first block based at least in part on validating the data of the transfer unit.

19 Claims, 4 Drawing Sheets

METADATA INDICATION FOR A MEMORY DEVICE

TECHNICAL FIELD

The following relates generally to a memory sub-system and more specifically to metadata indication for a memory device.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

DETAILED DESCRIPTION

Aspects of the present disclosure are directed to metadata indication for a memory sub-system. A memory sub-system can be a storage device, a memory module, or a hybrid of a storage device and memory module. Examples of storage devices and memory modules are described with reference to FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory sub-system controller. Each die can consist of one or more planes. Planes can be groups into logic units (LUN). For some types of non-volatile memory devices (e.g., NAND memory devices), each plane consists of a set of physical blocks, which are groups of memory cells to store data. A cell is an electronic circuit that stores information. A data block hereinafter refers to a unit of the memory device used to store data and can include a group of memory cells, a word line group, a word line, or individual memory cells.

Access operations, including reading, writing, erasing, and re-writing operations, can be performed on memory devices. During access operations, a host system can request data from a block of memory cells within the memory-sub-system. The block of memory cells can be a section of memory cells, such as a sector of memory cells. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

For example, during a read operation, the host system can request data from a block of memory cells within the memory device. In some cases, the request can include a LBA. The request can include metadata that can be used to identify the specific physical block of memory cells within the memory device to which the host system has logically requested access.

The memory device can be organized into physical sections of memory cells. The sections can be referred to as blocks and/or sectors. In some cases, the physical location that the host system has associated with the block of memory may not match the physical location of the memory cells in the memory device. This mismatch can be caused by the memory device's physical sections of memory cells being organized differently than how the host system has logically organized the blocks.

For example, the host system can organize the data stored in the memory cells into sequential sectors (e.g., 512 byte (B) sectors). In such cases, the addresses used by the host system for the blocks can be based upon the organization of the sectors. The memory cells of the memory device can be organized into physical sections (e.g., 4 kilobyte (kB) sections) or data blocks, referred to as transfer units (TUs). In such cases, the organization of the TU may not align with how the host system's blocks are organized. When the host system requests data, a mismatch can occur between the physical address of the memory cells (i.e., where the data is stored in the TUs) and the area to which the host system has logically addressed the block. The mismatch can be due to the host system associating the memory device with a contiguous unit of memory cells when the blocks are organized differently in reality. To avoid the wrong data from being accessed during access operations (e.g., by the LBA corresponding to the wrong physical location in the memory device), the memory sub-system can associate the blocks used by the host system to physical TUs within the memory device to access during access operations.

In some cases, metadata can be written to the TUs to identify which block of the host system (e.g., as communicated by the LBAs) resides in each TU. For example, metadata can be associated with the TU that can be used to determine which sectors are organized into each TU. In some cases, the metadata can be part of a Transfer Unit Address (TUA). The metadata can be read and used to determine which blocks are associated with the TU. When the TU is called, the memory sub-system can read the associated metadata to determine which memory cells to access for the corresponding block's access request from the host system. The memory sub-system can then access and transmit the correct data to the host during the access operation. Reading the metadata in the TUA during every read operation can introduce latency into the system. For example, reading the metadata can occupy resources that could otherwise be used for other functions of the memory sub-system. As such, latency in other operations can be increased in the memory sub-system. Additionally, power consumption can be increased due to the additional read cycles used to read the metadata.

Aspects of the present disclosure address the above and other deficiencies through the use of a memory sub-system that includes metadata indicators. An indicator (e.g., a flag bit) can be included within the metadata of a TU to indicate that at least one sector (or block) of the TU is invalid (e.g., a sector has been erased in the TU). Some hardware of the memory sub-system (e.g., a coherency checker) can compare the metadata received from the host system with the metadata associated with the TU to determine whether the metadata matches. If the metadata matches (e.g., the indicator in the metadata of the TU is not set), the memory sub-system can refrain from reading the metadata during the read operation. If the metadata does not match (e.g., the indicator of the metadata of the TU is set), the memory sub-system can read the metadata during the read operation. The memory sub-system can read the metadata during a read operation to determine which sectors of the TU are valid. For example, the memory sub-system can read the metadata during the read operation to determine which sector (e.g., 512 B block) has been erased within the TU. By not reading the metadata in some read operations, the overall latency of the read operation can be lowered because the metadata may not be read in all cases, thereby freeing processing resources of the memory sub-system for other functions.

Features of the disclosure are initially described in the context of a computing environment as described with reference to FIG. 1. Features of the disclosure are described in the process flow diagram as described with reference to FIG. 2. These and other features of the disclosure are further illustrated by and described with reference to an apparatus diagram, and a computer diagram that relate to metadata indication as described with references to FIGS. 3-4.

Figure 1:
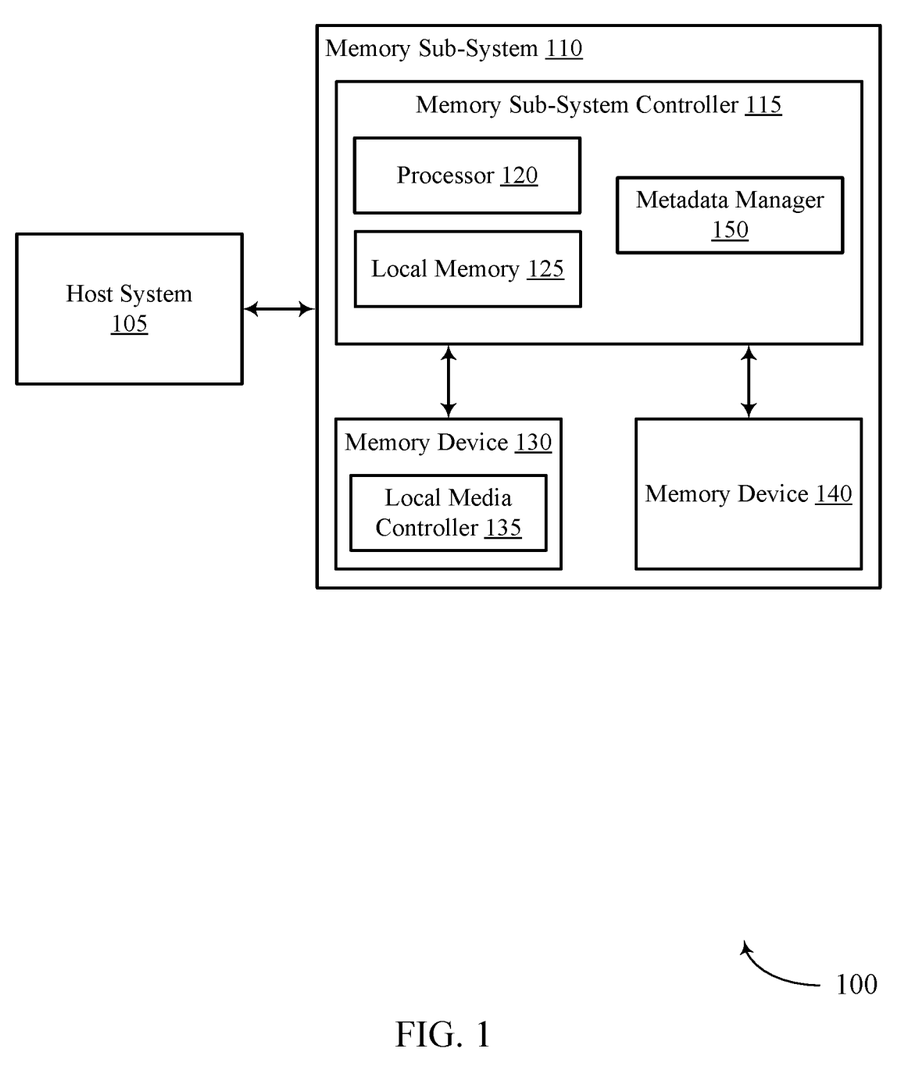
FIG. 1 illustrates an example of a computing system in accordance with examples as disclosed herein.

FIG. 1 illustrates an example of a computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access the memory components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device(s) 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system 110 includes a metadata manager 150 that can be configured to cause an indicator (such as a flag bit) within the metadata associated with the TUA to indicate when a sector (e.g., 512 B block) is invalid in the TU (e.g., the sector has been erased). This indicator can allow for the hardware of the memory device 140 to determine a mismatch in metadata during an access operation, and indicate the mismatch to the memory sub-system controller 115. The memory sub-system 110 can then read the TUA's metadata to determine which 512 B block has been erased. However, in some cases, a flag bit may not be included in the TUA's metadata by the metadata manager 150. This can occur when the data within the TU is valid (e.g., when no erasure has been performed on the 512 B blocks within the TU). In such cases, the memory sub-system can bypass reading the TUA's metadata (e.g., may not read the TUA's metadata) and access the TU's memory cell's data. In some examples, the memory sub-system controller 115 includes at least a portion of the metadata manager 150. For example, the memory sub-system controller 115 can include a processor 120 (e.g., a processing device) configured to execute instructions stored in local memory 125 for performing the operations described herein. In some examples, the metadata manager 150 is part of the host system 105, an application, or an operating system.

Figure 2:
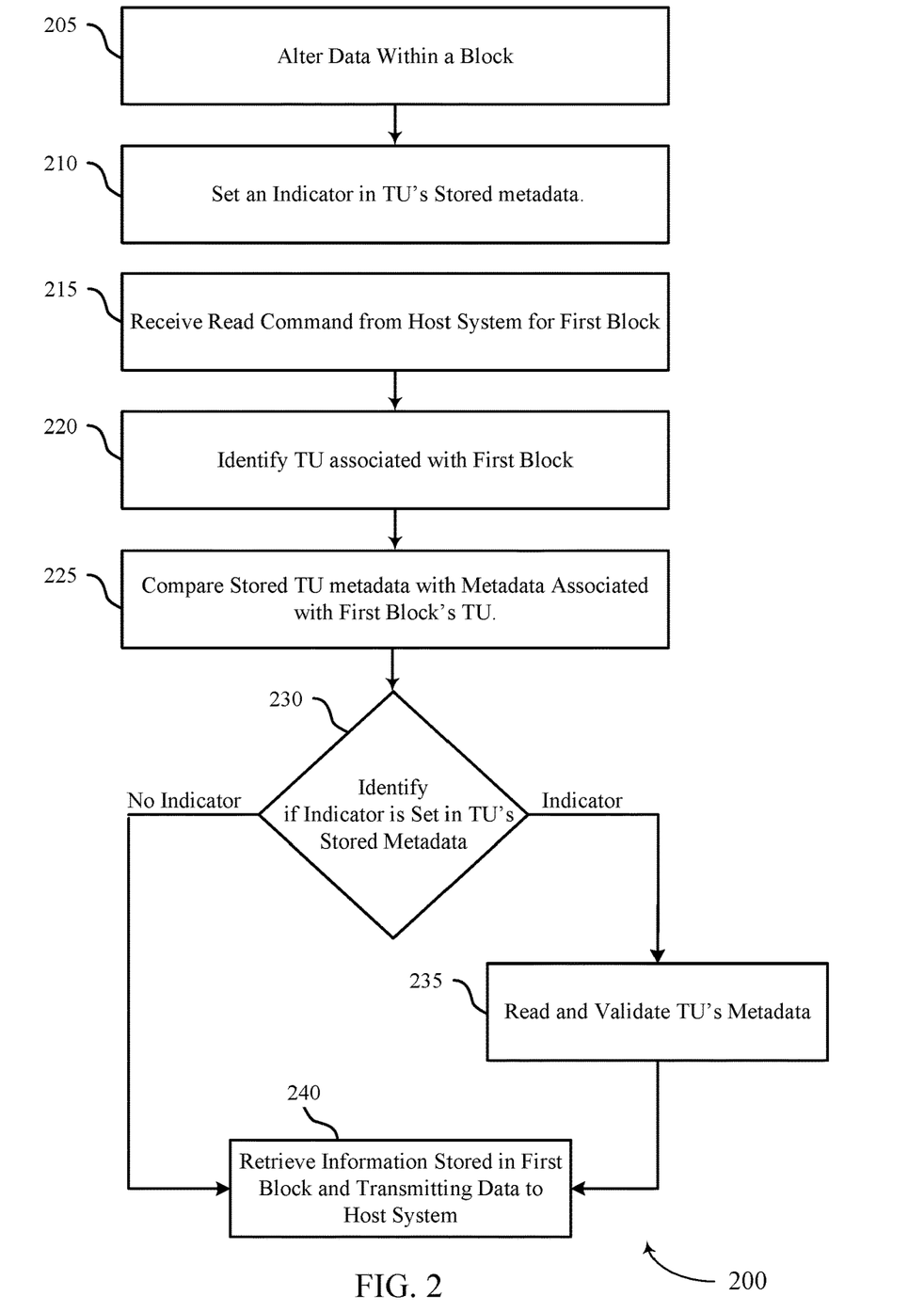
FIG. 2 illustrates an example of a process flow that supports metadata indication for access operations of a memory device in accordance with examples as disclosed herein.

FIG. 2 illustrates an example of a method 200 that supports metadata indication techniques for an access operation of a memory sub-system in accordance with some examples of the present disclosure. In some examples, the method 200 can be performed by a memory device, which can be an example of a memory device 130 with reference to FIG. 1. In other examples, the method 200 can be performed by a memory sub-system, which can be an example of a memory sub-system 110 described with reference to FIG. 1.

The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed additionally or alternatively by memory sub-system controller 115 of FIG. 1. In other embodiments, the method 200 can be performed by local media controller 135 of FIG. 1. Although shown in a particular sequence or order, unless otherwise specified, the order of the processes can be modified. The illustrated embodiments should be understood only as examples, and the illustrated processes can be performed in a different order, and some processes can be performed in parallel. Additionally, one or more processes can be omitted in various embodiments. Not all processes are used in every embodiment. Other process flows are possible.

The memory sub-system can receive access commands from the host system. Such access commands can be read commands, write commands, or erase commands which can read, erase, write, and/or re-write data to specific memory cells in memory devices of the memory sub-system. In some cases, the access commands can correspond to specific blocks of memory cells within the memory device. In some cases, the memory sub-system can perform an access operation on the blocks corresponding to the host system's access commands(s).

However, in some cases, the block address corresponding to the host system's access command may not correspond to the physical block of memory cells within the memory sub-system. For example, the host system can communicate an LBA, which can contain metadata associated with the block of memory that the host system wishes to read. In some cases, the memory sub-system's organization may not match the organization that the host system has based the LBA's metadata on. For example, the host system can have based the LBA using a sector or block having a first size of memory cells within the memory sub-system (e.g., 512 B). In such cases, the read command can correspond to a read operation of a block of memory of the first size in the memory device. However, the memory sub-system can be configured to access memory cells using sector, block, or section having a second size different than the first size (e.g., 4 kB). In such cases, the TU of the second size and the block of the first size may not match.

The sectors or blocks can be organized into TUs by the memory sub-system, and the memory sub-system can associate a number of the host systems' sectors or blocks into a single TU. For example, a single TU (e.g., 4 kB) can include eight sectors or blocks (e.g., 512 B). In other examples, a single TU can include any number of sectors or blocks (e.g., one, two, three, four, five, six, seven, eight, etc.). The memory sub-system can index the organization of the sectors or blocks relative to the TUs in a logical-to-physical (L2P) table. The L2P table can serve as a bit map used to identify where the logical values (e.g., the sectors or blocks) physically reside in the memory device. Because there is a mismatch between size of the sectors or blocks requested by the host system and the size of the sections retrieved from the memory device, the memory sub-system can access more memory than requested by the host system. The organization of the sectors or blocks into TUs can prevent the memory sub-system from accessing the data of a single LBA at a time due to the granularity of the memory sub-system being larger than the granularity of the host system.

The memory sub-system can include a bit map used to track which sectors or blocks reside in which TU. The bit map can be included as sixteen bits of metadata contained in a TUA associated with the TU. In some examples, the bit map can be stored in the memory device. In other cases the bit map can be stored in a table, such as an L2P table which can be called by the memory sub-system to compare during access operations. The sixteen bits of metadata can be read before accessing the specific memory cells to determine which sectors or blocks reside in the TU. The metadata can additionally or alternatively include information about the memory cells within the TU (e.g., if a block of memory cells has been erased). In such cases, the correct data can be accessed by the memory sub-system during a read operation and communicated to the host system.

Latency can be introduced into the memory sub-system by reading the metadata (e.g., sixteen bits) before accessing the memory cells as compared with not accessing or reading the metadata. In such cases, a comparison (e.g., parity check) can be used to avoid reading the metadata before accessing the memory cells. The comparison can compare the stored metadata of the TU stored on the memory device with other metadata associated with the block received from the host system. If the metadata received from the host system (e.g., second metadata) matches the TU's metadata (e.g., there is parity), then accessing the memory cells can be performed without the memory sub-system reading the metadata. In such cases, the latency of the memory sub-system for performing a read operation can be reduced. However, in some cases, a mismatch can occur between the metadata of the TU and the second metadata. This can be due to an error in the metadata received from the host system or an error introduced into the metadata stored in the memory sub-system. In some embodiments, an indicator can be included in the metadata stored by the memory sub-system that can cause a mismatch when the indicator is set.

At operation 205, information stored within a TU can be altered. For example, the memory sub-system can alter information stored in at least one sector or block of the transfer unit. The sectors or blocks received from the host system can be referred to as a block or an LBA. For example, data within a block of memory cells within the TU can be altered in response to the host system's write command. For example, the host system can cause the data stored in one or more blocks of the TU to be erased. In other examples, For example, altering the information stored in the at least one block of the transfer unit includes deleting the information in the at least one block of the transfer unit. In other examples, the write operation can write data to and/or delete data from one or more blocks of memory cells within the memory sub-system. In other examples, the memory sub-system can receive, from the host system, a write command to store or delete the information of a second block of the transfer unit, where altering the information is based on receiving the write command. The data within one or more blocks of memory cells within the TU can be altered from an initial state before the access operation. When the data is altered within the TU, the memory sub-system can indicate the alteration has occurred by an indicator or a flag in the metadata associated with the TU (e.g., in the TUA's stored metadata).

At operation 210, an indicator can be set in the stored metadata associated with the TU. For example, the memory sub-system can set the indicator of the transfer unit based on altering the information stored in the at least one block of the transfer unit, where identifying that the flag is set is based on setting the indicator. In some cases, the access operations can cause the memory sub-system to indicate that the data within the memory sub-system has changed. The TU can contain multiple blocks of memory cells (e.g., eight blocks of memory cells can be contained in one TU). When an alteration of the data (e.g., and erasure) occurs to one or more of the blocks of memory cells within the TU, an indicator (e.g., one or more bits of the metadata) can be set by the memory manager to indicate the change. The indicator can signify that the metadata associated with the TU (e.g., the TUA's metadata) can be read to determine which block of memory cells has been altered. The indicator can be configured to cause the memory device to skip reading the metadata during some read operation. In some cases, the memory manager can set the indicator by setting a bit in the metadata associated with the TU (e.g., the TUA's metadata). For example, the indicator includes a single bit of the metadata stored by the memory device. In some cases, the indicator bit can be in addition to the bits of metadata associated with the TU, (e.g., a seventeenth bit of metadata where sixteen bits of metadata were formerly used). The metadata can be stored in the memory sub-system's hardware and/or firmware. The metadata can be used to compare against second metadata (e.g., the metadata received from the host system) associated with the TU to determine if a mismatch has occurred. The mismatch can determine if the bits of metadata in addition to the indicator can be read before accessing the block of memory cells. In some cases, the indicator can be referred to as a flag, a flag bit, or a combination thereof.

In some cases, operation 205 and 210 can occur at any time throughout method 200. As such, the indicator can be set as illustrated in FIG. 2, or in alternative placements other than those illustrated in FIG. 2. Alternatively, an indicator may not be set (e.g., operation 205 and operation 210 may not occur). This can be due to data not being altered in the transfer unit. The alteration vs. non-alteration of the block(s) of memory cells can be used to determine if metadata is read as part of performing the access operation (e.g., read operation) on the TU.

At operation 215, a memory sub-system can receive an access command, such as a read command, from a host system. For example, the memory sub-system can receive, from a host system, a read command to retrieve information from a first block of a memory device. The read command can correspond to accessing a first block of memory within the memory sub-system. The host system can communicate metadata associated with the block of memory in addition to, or in, the access command. In some cases, the metadata can be an LBA. In other cases, the metadata can be used to identify an address (e.g., an LBA). For example, the memory sub-system can identify a logical block address of the first block based on receiving the read command, where identifying the transfer unit is based on identifying the logical block address. In these examples, the LBA can be used to determine which block of memory the access command specifically relates to. For example, the LBA can be stored in the L2P table, and can be called by the memory sub-system. The memory sub-system's memory cells can be organized into TU. In some cases, the TUs can be organized into a first size (e.g., 4 kB). The host system can request access of blocks of memory cells having a second size (e.g., 512 B) different than the first size. As such, a mismatch in size can be present between the block requested by the host system and the TU used by the memory sub-system.

At operation 220, the memory sub-system can identify a TU associated with the block of memory requested by the host system (e.g., the first block). For example, the memory sub-system can identify a transfer unit associated with the first block indicated in the read command. There can be a mismatch between the host systems block size and the memory sub-systems TU's size. For example, the block of memory cells can correspond to 512 B and the TU can correspond to 4 kB. In such an example, the memory sub-system can organize eight blocks of memory into one TU. In other examples, the TU can correspond to a page of memory and the block of memory cells can correspond to less than a page of memory. For example, the transfer unit includes a page of memory and the first block includes less memory than the page of memory. The memory sub-system can organize multiple blocks of memory into one TU. The memory sub-system can move data associated with a block of memory to and from TUs dynamically to organize the data to maximize performance, among other reasons, such as wear leveling. The memory sub-system can manage the organization of the blocks of memory into TU's by utilizing bit map(s). The bit map(s) can map the bits of data of the TU, so that access operations can be performed on the specific blocks of data contained in the TU. The bitmap can be included as metadata associated with the TU. For example, the bitmap can include information about which host system's blocks of memory are associated with the TU, and what (if any) type of data is included in the TU. The metadata can be read during access operations to ensure that the correct data is passed to the host system (e.g., validated) when the memory sub-system accesses the physical memory cells. In some examples, the metadata may not be read to reduce latency in the memory sub-system. The reading vs. non-reading of the metadata can be based upon the indicator (e.g., flag bit) in the metadata being set.

At operation 225, the first metadata (e.g., the metadata stored by the memory sub-system) can be compared with second metadata associated with the TU (e.g., received from the host system). For example, the memory sub-system can compare the metadata of the transfer unit stored by the memory device with second metadata associated with the transfer unit identified based on the read command, where identifying that the indicator is set is based on comparing the metadata with the second metadata. In some cases the second metadata can be the LBA received from the host system or can be the metadata associated with the requested block. In some cases, the first metadata can be stored in the L2P table. For example, the metadata can be stored in a logical-to-physical table configured for performing one or more parity checks. The first metadata can include the indicator. The indicator can be stored along with the additional metadata associated with the TU (e.g., indicating which blocks of memory are associated with the memory device). the indicator can be an additional bit of metadata in addition to the bits of metadata (e.g., sixteen bits or thirty-two bits) associated with the TU. In such cases, the indicator can be used to cause a mis-match between the first metadata that includes indicator and second metadata that does not include the indicator.

The comparison of the two metadata can be performed by hardware of the memory sub-system, such as coherency checker or a parity checker. In some cases, the memory device can perform a parity check as part of the access operation on memory cells within the memory device. A parity check can be used to determine if the logically requested block of memory cells corresponds to the physical memory cells within the memory device. If the parity check indicates that there is a mismatch between the compared data, the firmware of the memory sub-system can implement one or more operations in an attempt to determine the causes of the mismatch or to resolve the mismatch. The firmware of the memory sub-system can be configured to determine that the indicator is present in the first metadata after the parity check indicates a mismatch. In some cases the second metadata can match the first metadata, and the memory sub-system can validate that the correct data is being accessed.

In some cases, the mismatch between the data can be caused by the indicator (e.g., flag bit) included in the first metadata stored by the memory sub-system and associated with the TU. For example, an alteration (e.g., an erasure) of a block of data in the TU can be indicated by setting the indicator in the first metadata. The first metadata can be compared with the second metadata. Because the extra bit lies outside the range of the second metadata (e.g., the first metadata that includes an indicator can be seventeen bits and the second metadata can be sixteen bits), there can be a mismatch between the two metadata, which can trigger reading the first metadata to determine which block(s) are invalid or have been erased. This mismatch can be different from a mismatch in metadata in the non-indicator bits of metadata.

At operation 230, the memory sub-system can identify if the indicator is set in the metadata associated with the TU. For example, the memory sub-system can identify that an indicator is set in metadata of the identified transfer unit stored by the memory device based at least in part on identifying the transfer unit. The memory sub-system (in some cases, the memory device) can compare the TUA and the LBAs' metadata, and if the indicator has been set, a mismatch can be identified. In such cases, the mismatch can be determined via the parity check, and a logical value can be sent to the memory sub-system's firmware indicating the lack of parity. For example, comparing the first metadata with the second metadata can be performed as part of a parity check. Additionally, the memory sub-system can indicate, by hardware to firmware, that a mismatch exists between the first metadata and the second metadata, where comparing the metadata with the second metadata is performed by the hardware. In some cases, the logical value can be communicated from the hardware (e.g., when the parity check is performed) to the firmware of the memory device. For example, the memory sub-system can identify a logic value of a bit of the metadata based at least in part on the hardware indicating that the mismatch exists, where identifying that the flag is set is based at least in part on identifying the logic value of the bit.

The lack of parity can cause the memory sub-system to read the metadata that includes the indicator to determine which (if any) of the blocks of memory have been erased. For example, at operation 235, the memory sub-system can read the remaining metadata of the flagged TU. For example, the memory sub-system can read metadata of the transfer unit stored by the memory device, where validating the data of the transfer unit is based at least in part on reading the metadata. In this example, the indicator can have been set in response to an alteration of the data within the TU. The memory sub-system can read the additional metadata to determine which block was altered. This way, the memory sub-system can validate the metadata via reading the additional metadata. For example, the memory sub-system can validate data of the transfer unit stored in the memory device based at least in part on identifying that the flag is set in the metadata.

Alternatively or additionally, at operation 230, the memory sub-system can identify that the indicator was not set in the metadata associated with the TU (e.g., the TUA's metadata). For example, retrieving the information stored in the first block can be performed without validating the metadata of the transfer unit based at least in part on determining that the indicator is not set. The memory sub-system (in some cases using the memory device) can compare the first metadata and the second metadata, and if the indicator is not set, then no mismatch can be identified. In such cases, the parity check can determine that there is no mismatch between the compared metadata. The lack of mismatch can allow the memory sub-system to bypass reading the metadata (e.g., bypass the operation 235) and the memory sub-system can proceed to accessing the block of memory cells requested by the host system's access command.

At operation 240, the memory sub-system can access (e.g., retrieve) the data in the TU associated with the host systems' access command. For example, the memory sub-system can retrieve the information stored in the first block based at least in part on validating the data of the transfer unit. In some examples, the data can be accessed after performing the validation of the metadata (e.g., in the case where the flag indicated a block's erasure) or can be performed without validating the metadata (e.g., where no flag bit was indicated). Accessing the data within the TU without reading the associated metadata can reduce the latency of, and thereby improve the performance of the memory sub-system. The memory sub-system can then transmit the data within the TU to the host system. For example, the memory sub-system can transmit, to the host system, the information stored in the first block based at least in part on retrieving the information.

It should be noted that the methods described above describe possible implementations, and that the operations and the steps can be rearranged or otherwise modified and that other implementations are possible. Furthermore, portions from two or more of the methods can be combined.

Figure 3:
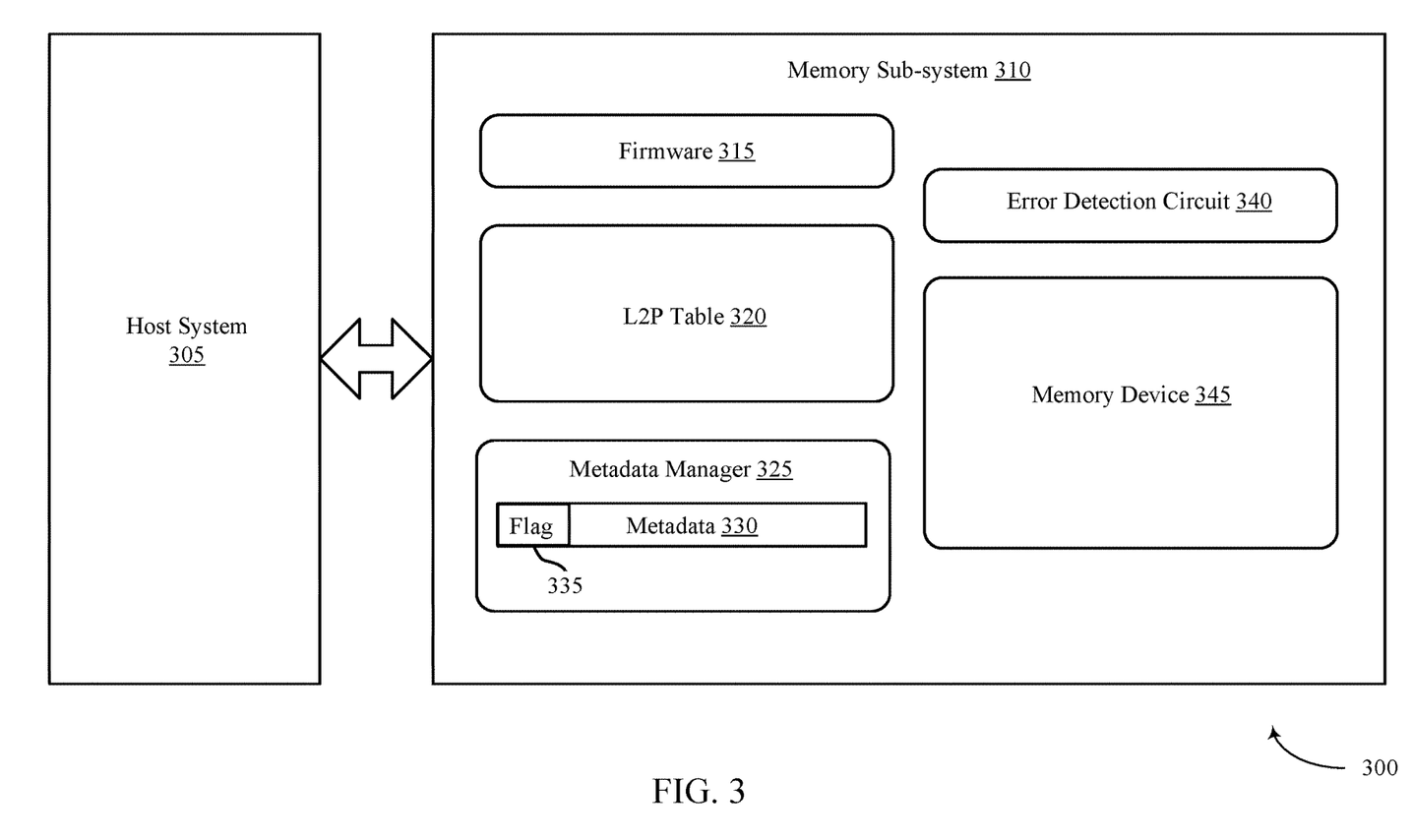
FIG. 3 illustrates an example system that supports metadata indication for access operations of a memory device in accordance with examples as disclosed herein

FIG. 3 illustrates an example of a system 300 that supports indicating techniques for access operations of a memory device in accordance with examples as disclosed herein. In some cases, system 300 can perform method 200 as described with reference to FIG. 2.

System 300 includes a host system 305 and a memory sub-system 310. The host system 305 can be an example of host system 105 described with reference to FIG. 1. The host system 305 can send access commands to the memory sub-system 310 such as read commands, write commands, or erase commands which can read, erase, write, and/or re-write data to blocks of memory cells within the memory sub-system 310. In some cases, the host system 305 can additionally send metadata associated with the commands. For example, during a read operation, the host system can send a read command to the memory sub-system 310 which can include metadata associated with the block of memory that the host system has requested to access using a read operation. As described with reference to FIG. 2, the read request and/or metadata received from the host system 305 can be based upon an organization of blocks of memory cells within the memory sub-system 310 having a first size (e.g., 512 B) when the physical organization of the memory sub-system 310 can be based upon a different organization have a second size (e.g., 4 kB) different than the first size.

Mismatches between the organization of the blocks used by the host system 305 and the organization of the TUs used by memory sub-system 310.

System 300 can also include memory sub-system 310. The memory sub-system 310 can be an example of memory sub-system 110 as described with reference to FIG. 1. The memory sub-system 310 can perform method 200 as discussed with reference to the memory sub-system in FIG. 2. In some cases, the memory sub-system can receive the access commands and/or metadata from the host system 305.

The memory sub-system 310 can include firmware 315, an L2P table 320, a metadata manager 325, an error detection circuit 340, a memory device, or a combination thereof. Firmware 315 can be implemented by components of memory sub-system controller 115 such as processor 120, local memory 125, and/or local media controller 135 as described with reference to FIG. 1. Firmware 315 can perform the processing of data contained in memory sub-system 310. For example, the firmware 315 can determine which blocks of memory correspond to which TUs in the memory device. In other examples, the firmware 315 can read the metadata associated with the TU and/or read the metadata received from the host system 305. Additionally, the firmware 315 can validate the data contained in the TUs. For example, the firmware 315 can receive the indication of a mismatch of the metadata stored by the memory sub-system 310 and the metadata received from the host system 305. The indication of the mismatch can be received from an error detection circuit 340. This can cause the firmware to read the metadata associated with the TU to validate the data contained in the TU. Once the metadata is validated, the firmware 315 can access the memory cells within the memory device 345 and transmit the data to the host system 305 after the validation.

The memory sub-system 310 can include an L2P table 320. As described with reference to FIG. 2, the L2P table 320 can be used as a bit map for the memory cells within memory sub-system 310. In some cases, the L2P table 320 can store the metadata associated with each TU. The L2P table can be called by the memory sub-system 310 (e.g., by firmware 315) when an access command is received from host system 305. The L2P table 320 can be used to compare the metadata with metadata that can be modified by the memory sub-system 310. In some examples, L2P table 320 can be part of firmware 315 and/or metadata manager 325 or can be a separate component within memory sub-system 310.

The memory sub-system 310 can include metadata manager 325. As described with reference to FIG. 2, the metadata manager 325 can modify the metadata associated with the TU when data within the TU has been erased. For example, metadata manager 325 can cause the flag 335 to be included with the metadata 330 based on changing or erasing a block of data in a TU. Metadata 330 can be metadata associated with the TU. The flag 335 can be a single bit of data included with metadata 330. In some cases, the flag 335 can be a bit that is added to the length of the normal metadata. In some examples, metadata manager 325 can be part of firmware 315, or can be a separate component within memory sub-system 310.

The memory sub-system 310 can include error detection circuit 340 and memory device 345. Error detection circuit 340 can compare the metadata stored in the L2P table 320 with the metadata received from host system 305. The error detection circuit 340 can identify a mismatch in the two metadatas during a parity check and can indicate the mismatch to the firmware 315 of the memory sub-system 310. In some cases, the error detection circuit 340 can be an example of a parity check circuit or a coherency checker. In some cases, the error detection circuit 340 can be part of the memory device 345. In some cases, the error detection circuit 340 can be part of the broader memory sub-system 310. In some cases, metadata 330 can include a flag 335 or indicator. This can be in response to a block within the TU being erased. The metadata 330 with or without a flag 335 can be stored in the L2P table 320, in some examples. The error detection circuit 340 can compare the metadata 330 with or without the flag 335 with the metadata received from the host system 305. In the case where the flag 335 is included with metadata 330, the flag 335 can cause for a mismatch between the two metadata. In such cases, the error detection circuit 340 can send a logical value to the firmware 315 indicating the mismatch. The mismatch can cause the memory sub-system 310 (e.g., firmware 315) to read metadata 330 before accessing and transmitting the data in the memory device 345 to check the validity of the data.

In examples where the metadata 330 does not include flag 335, the error detection circuit 340 may not send a logical value to the firmware 315 or can send a different logical value to the firmware 315 indicating a match. The firmware 315 can access the memory cells in memory device 345 without reading the metadata and can send the data to the host system 305 based on there being a match. This can reduce the latency in access operations in memory sub-system 310 and improve performance of the memory sub-system 310.

Figure 4:
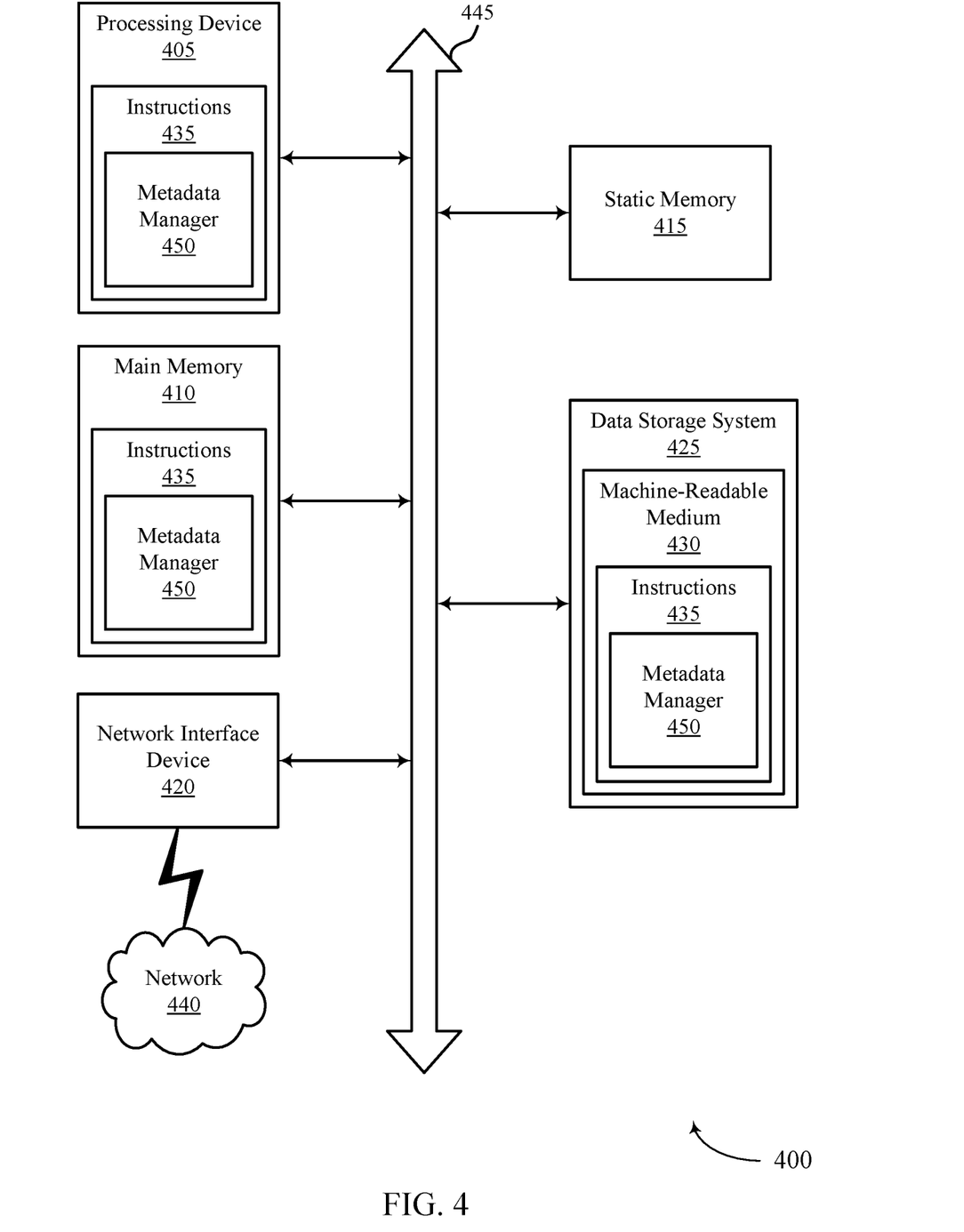
FIG. 4 illustrates an example machine of a computer system that supports metadata indication for a memory device in accordance with examples as disclosed herein.

FIG. 4 illustrates an example machine of a computer system 400 that supports metadata indication for a memory device in accordance with examples as disclosed herein. The computer system 400 can include a set of instructions, for causing the machine to perform any one or more of the techniques described herein. In some examples, the computer system 400 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the metadata manager 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies in such cases.

The example computer system 400 can include a processing device 405, a main memory 410 (e.g., read-only memory (ROM), flash memory, DRAM such as synchronous DRAM (SDRAM) or RDRAM, etc.), a static memory 415 (e.g., flash memory, static random access memory (SRAM), etc.), and a data storage system 425, which communicate with each other via a bus 445.

Processing device 405 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 405 can also be one or more special-purpose processing devices such as an ASIC, a FPGA, a DSP, network processor, or the like. The processing device 405 is configured to execute instructions 435 for performing the operations and steps in such cases. The computer system 400 can further include a network interface device 420 to communicate over the network 440.

The data storage system 425 can include a machine-readable storage medium 430 (also known as a computer-readable medium) on which is stored one or more sets of instructions 435 or software embodying any one or more of the methodologies or functions described herein. The instructions 435 can also reside, completely or at least partially, within the main memory 410 and/or within the processing device 405 during execution thereof by the computer system 400, the main memory 410 and the processing device 405 also constituting machine-readable storage media. The machine-readable storage medium 430, data storage system 425, and/or main memory 410 can correspond to a memory sub-system.

In one example, the instructions 435 include instructions to implement functionality corresponding to a metadata manager 450 (e.g., the metadata manager 150 described with reference to FIG. 1). While the machine-readable storage medium 430 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
   receiving, from a host system, a read command to retrieve information from a first block of a memory device;
   identifying a transfer unit associated with the first block indicated in the read command;
   identifying whether an indicator is included in metadata of the identified transfer unit indicating that at least one sector of the transfer unit has been altered based at least in part on identifying the transfer unit;
   validating data of the transfer unit stored in the memory device based at least in part on identifying whether the indicator is included in the metadata; and
   retrieving the information stored in the first block based at least in part on validating the data of the transfer unit, wherein retrieving the information stored in the first block is performed without validating the metadata of the transfer unit based at least in part on determining that the indicator is not included in the metadata.

2. The method of claim 1, further comprising:
altering information stored in at least one block of the transfer unit; and
setting the indicator of the metadata of the transfer unit based at least in part on altering the information stored in the at least one block of the transfer unit, wherein identifying the whether the indicator is included in the metadata is based at least in part on setting the indicator.

3. The method of claim 2, further comprising:
receiving, from the host system, a write command to store or delete the information of a second block of the transfer unit, wherein altering the information is based at least in part on receiving the write command.

4. The method of claim 2, wherein altering the information the information stored in the at least one block of the transfer unit comprises:
deleting the information in the at least one block of the transfer unit.

5. The method of claim 1, further comprising:
identifying a logical block address of the first block based at least in part on receiving the read command, wherein identifying the transfer unit is based at least in part on identifying the logical block address.

6. The method of claim 1, further comprising:
reading metadata of the transfer unit stored by the memory device, wherein validating the data of the transfer unit is based at least in part on reading the metadata.

7. The method of claim 1, further comprising:
transmitting, to the host system, the information stored in the first block based at least in part on retrieving the information.

8. The method of claim 1, wherein the indicator comprises a single bit of the metadata stored by the memory device.

9. The method of claim 1, wherein:
the transfer unit comprises a page of memory; and
the first block comprises less memory than the page of memory.

10. The method of claim 1, wherein the metadata is stored in a logical-to-physical table configured for performing one or more parity checks.

11. A method, comprising:
receiving, from a host system, a read command to retrieve information from a first block of a memory device;
identifying a transfer unit associated with the first block indicated in the read command;
identifying an indicator in metadata of the identified transfer unit indicating that at least one sector of the transfer unit has been altered based at least in part on identifying the transfer unit;
comparing the metadata of the transfer unit stored by the memory device with second metadata associated with the transfer unit identified based at least in part on the read command, wherein identifying the indicator is based at least in part on comparing the metadata with the second metadata;
validating data of the transfer unit stored in the memory device based at least in part on identifying the indicator in the metadata; and
retrieving the information stored in the first block based at least in part on validating the data of the transfer unit.

12. The method of claim 11, further comprising:
indicating, by hardware to firmware, that a mismatch exists between the metadata and the second metadata, wherein comparing the metadata with the second metadata is performed by the hardware.

13. The method of claim 12, further comprising:
identifying a logic value of a bit of the metadata based at least in part on the hardware indicating that the mismatch exists, wherein identifying the indicator is based at least in part on identifying the logic value of the bit.

14. The method of claim 11, wherein comparing the metadata with the second metadata is performed as part of a parity check.

15. A system, comprising:
a plurality of memory components; and
a processing device, operatively coupled with the plurality of memory components, to:
receive, from a host system, a read command to retrieve information from a first block of a memory device;
identify a transfer unit associated with the first block indicated in the read command;
identify whether an indicator is included in metadata of the identified transfer unit indicating that at least one sector of the transfer unit has been altered based at least in part on identifying the transfer unit;
validate data of the transfer unit stored in the memory device based at least in part on identifying whether the indicator is included in the metadata; and
retrieve the information stored in the first block based at least in part on validating the data of the transfer unit, wherein retrieving the information stored in the first block is performed without validating the metadata of the transfer unit based at least in part on determining that the indicator is not included in the metadata.

16. The system of claim 15, wherein the processing device is to:
alter information stored in at least one block of the transfer unit; and
set the indicator of the metadata of the transfer unit based at least in part on altering the information stored in the at least one block of the transfer unit, wherein identifying whether the indicator is included in the metadata is based at least in part on setting the indicator.

17. The system of claim 15, wherein the processing device is to:
identify a logical block address of the first block based at least in part on receiving the read command, wherein identifying the transfer unit is based at least in part on identifying the logical block address.

18. A system, comprising:
a plurality of memory components; and
a processing device, operatively coupled with the plurality of memory components, to:
receive, from a host system, a read command to retrieve information from a first block of a memory device;
identify a transfer unit associated with the first block indicated in the read command;
identify an indicator in metadata of the identified transfer unit indicating that at least one sector of the transfer unit has been altered based at least in part on identifying the transfer unit;
compare the metadata of the transfer unit stored by the memory device with second metadata associated with the transfer unit identified based at least in part on the read command, wherein identifying the indicator is based at least in part on comparing the metadata with the second metadata;

validate data of the transfer unit stored in the memory device based at least in part on identifying the indicator in the metadata; and retrieve the information stored in the first block based at least in part on validating the data of the transfer unit.

19. A non-transitory computer-readable medium storing code for wireless communication, the code comprising instructions executable by a processor to:

receive, from a host system, a read command to retrieve information from a first block of a memory device;

identify a transfer unit associated with the first block indicated in the read command;

identify whether an indicator is included in metadata of the identified transfer unit indicating that at least one sector of the transfer unit has been altered based at least in part on identifying the transfer unit;

validate data of the transfer unit stored in the memory device based at least in part on identifying whether the indicator is included in the metadata; and retrieve the information stored in the first block based at least in part on validating the data of the transfer unit, wherein retrieving the information stored in the first block is performed without validating the metadata of the transfer unit based at least in part on determining that the indicator is not included in the metadata.

* * * * *

UNITED STATES PATENT AND TRADEMARK OFFICE
CERTIFICATE OF CORRECTION

Page 1 of 1

PATENT NO. : 11,221,776 B2
APPLICATION NO. : 16/730919
DATED : January 11, 2022
INVENTOR(S) : Ish et al.

It is certified that error appears in the above-identified patent and that said Letters Patent is hereby corrected as shown below:

In the Claims

Claim 4 should read:
"The method of claim 2, wherein altering the information stored in the at least one block of the transfer unit comprises:
deleting the information in the at least one block of the transfer unit."

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*